April 19, 1949.　　C. W. ABERCROMBIE　　2,467,716
WEIGHTED RELIEF VALVE

Filed Jan. 24, 1947　　　　　　　　　　　2 Sheets-Sheet 1

INVENTOR
CHARLES W. ABERCROMBIE
BY
ATTORNEYS

April 19, 1949.     C. W. ABERCROMBIE     2,467,716
WEIGHTED RELIEF VALVE

Filed Jan. 24, 1947     2 Sheets-Sheet 2

INVENTOR
CHARLES W. ABERCROMBIE
ATTORNEYS

Patented Apr. 19, 1949

2,467,716

UNITED STATES PATENT OFFICE 2,467,716

WEIGHTED RELIEF VALVE

Charles W. Abercrombie, Bridgeport, Conn., assignor to Karen Products, Inc., a corporation of New York Application January 24, 1947, Serial No. 724,088

2 Claims. (Cl. 137—53)

This invention relates to a weighted relief valve intended particularly for venting the pressure within pressure cookers.

In my application, Serial No. 642,526, filed January 21, 1946, I have illustrated and described a pressure cooker with novel pressure control means. The pressure relief vent, mounted on the cover, is closed by a steel ball valve of insignificant weight, which, if not held on its seat at the upper end of the vent passage, would be displaced at substantially any cooker pressure above atmospheric. This ball is held on its seat by means of a weight supported upon the ball and at a second point spaced from the ball and beyond the center of gravity of the weight. Thus the effective pressure exerted by the weight upon the ball depends upon the distance of the second point of support from the ball and this distance can be varied as follows: The weight is made in the form of a rotatable knob loosely journalled upon the cooker, and provided on the undersurface with a plurality of projections spaced at progressively greater distances from the axis of the knob. A slightly elevated groove is provided on the cooker beneath the knob, within which any one of the projections may be seated by appropriate manipulation of the knob, and made to serve as the second point of support or fulcrum. Thus the cook, by turning the knob, which is suitably marked, shifts the fulcrum and varies the moments of the weighted knob about that fulcrum, thereby readily controlling the pressure at which the ball will be displaced and hence the pressure at which the food will be cooked. At one point on the underface of the knob there is a depression large enough to receive the ball and permit its outward movement under pressure. Thus, when the knob is set so that this depression overlies the ball, the steam within the cooker is vented, at substantially atmospheric pressure.

This pressure control means works excellently in actual use in the many cookers equipped with it. It is subject, however, to one shortcoming: If, after the source of heat has been removed, the cook permits the steam within the cooker to condense before the cover is removed, a vacuum is formed which makes it impossible to open the cooker unless the ball valve of the vent is unseated to permit equalization of internal and external pressures. This can be done by inserting a knife blade between the knob and the cover and rolling the ball partly out of its seat; nevertheless a careless and thoughtless cook may be momentarily dismayed, and others compelled to give thought to an operation that might better be accomplished automatically. It is the object of this invention to overcome this shortcoming. I have attained this object by providing the underface of the knob with a cam lug which engages the ball valve when the knob dial is set for venting, and positively rolls the ball out of its seat and holds it there, independent of steam or atmospheric pressures.

It is a further object of this invention to simplify and improve the safety valve shown in my earlier application.

In the accompanying drawings I have illustrated a preferred embodiment of my invention, although others could doubtless be devised within the scope of the appended claims. In these drawings:

Figure 1:
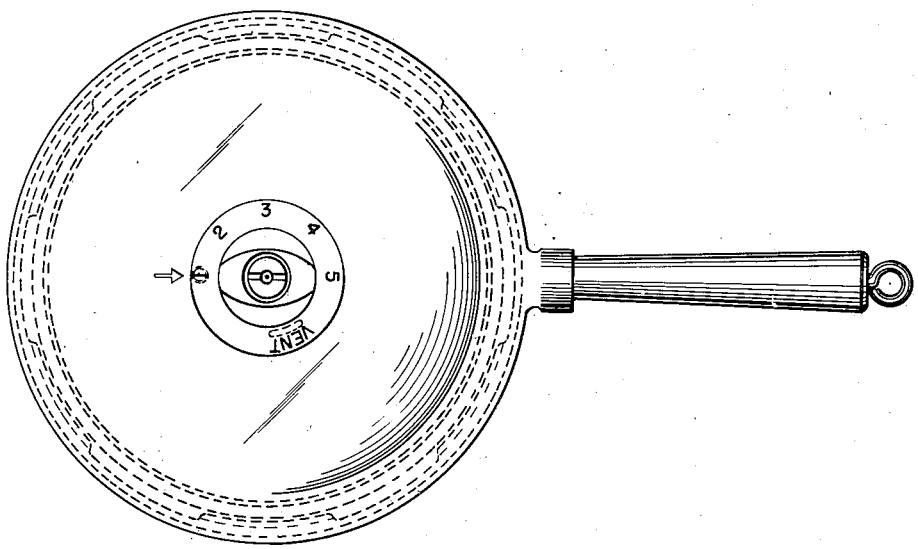
Figure 1 is a plan view of a pressure cooker equipped with the pressure-setting knob and safety valve of the present invention.
Figure 2:
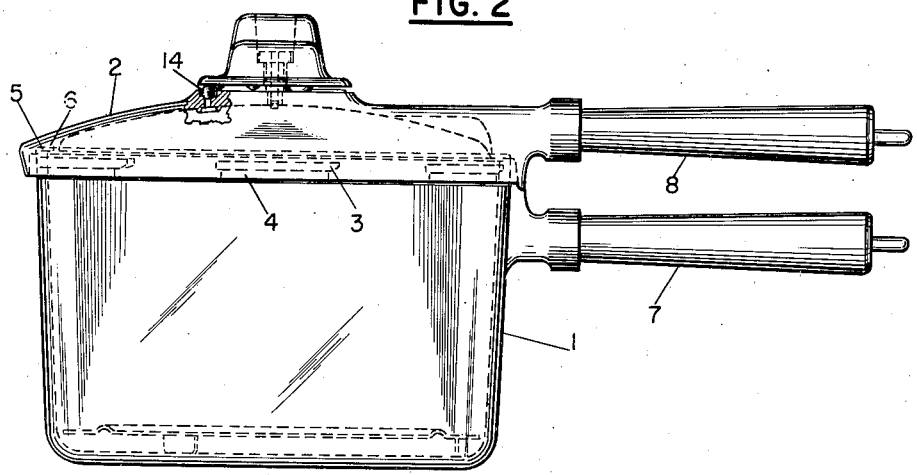
Figure 2 is a side elevation of the same cooker.

The pressure cooker shown in these drawings comprises a pot 1 on which is mounted a cover 2. The pot is provided, just below its rim, with a series of spaced external cam lugs 3, and the cover is likewise provided, on its flange, with a series of spaced internal cam lugs 4 designed to cooperate with the lugs on the pot to hold the cover in place during the cooking operation. The inner edge of the cover just above the flange is provided with an annular groove 5 which serves as the seat for an annular gasket 6 against which the rim of the body presses to form a tight seal during the cooking operation. The pot is provided with a handle 7 and the cover with a handle 8. To mount the cover upon the pot the cover handle 8 is swung counter-clockwise to make an angle of some 30° with the handle 7. In this operation the lugs 4 on the cover pass between the lugs 3 on the pot, and the rim of the pot lies against the gasket 6. The handle 8 is then swung clockwise causing the lugs 4 to move below and be cammed down by the lugs 3, drawing the gasket 6 firmly against the rim of the pot and making a steam-tight seal between the cover and the pot. Steam pressure may also be given access to the back of the gasket as shown in my application Serial No. 704,226, filed October 18, 1946. When the two handles are in vertical alignment the cover is properly seated on the pot.

As shown in the drawings, the cover is concavo-convex, but provided, at the center of its outer face with a flat circular area 9. Near the perimeter of this area, and diametrically opposite the handle 8, is a relief vent 11 terminating at its upper end in a conical valve seat 12 and at its lower end in a shallow cup defined by an annular ridge 13 cast on the cover. A steel ball valve 14 is mounted within the seat and when seated closes the vent 11. As shown best in Figure 3, this ball projects above the surface of the flat area 9. At the center of the flat area 9 is a threaded hole 15, and extending radially from this hole along the axis of the handle 8 is an elevated groove 16. Threaded within the hole 15 is a hollow cylindrical gudgeon or boss 17 terminating at its upper end in an enlarged head 18.

Figure 3:
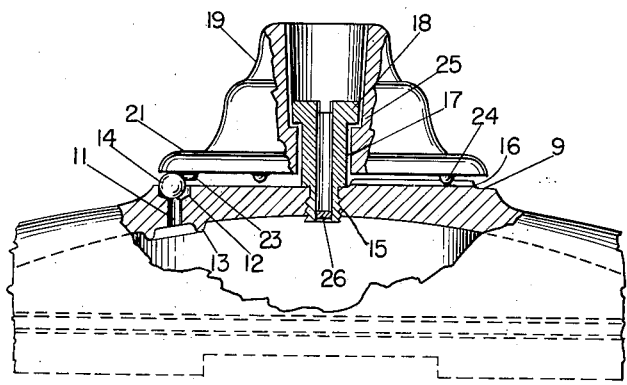
Figure 3 is an enlarged view, partly in vertical section, showing the relationship between the relief pressure ball valve, the pressure-setting knob and the safety valve, the knob being set at Vent.
Figure 4:
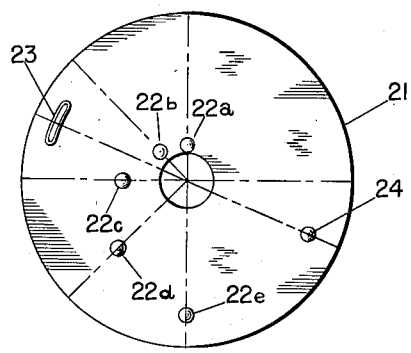
Figure 4 is a bottom view of the knob.

A pressure-setting knob 19 is loosely and rotatably journalled on and retained by the boss 17, as shown best in Figure 3. This knob comprises a circular plate 21 on which is mounted a bulbous handle designed for easy manipulation. The plate of the knob is of substantially the same size as the flat area 9 and, therefore, overlies the ball 14 and the groove 16. The lower face of the knob plate is provided with five projections 22a, 22b, 22c, 22d and 22e which, as shown in Figure 4, are spaced apart by angles of 45° and each is progressively farther from the center of the knob. These projections are arranged in what may be described as a spiral. A selected one of these five projections is designed to lie within the groove 9 and partly support the knob which overlies and is also partly supported by the ball valve 14. When the internal steam pressure balances that exerted by the weight of the knob fulcrumed on the projection lying within the groove 9, steam will escape and vent the cooker. This pressure can be varied by turning the knob selectively to place one of the projections 22 within the groove 9 and thus vary the moment arm of the knob. All of this has been described in greater detail in my application Serial No. 642,526.

In order to enable the cooker to vent at substantially atmospheric pressure, the underface of the knob plate shown in my earlier application was provided with a depression large enough to receive the ball, and diametrically opposite with a sixth projection placed near the periphery of the plate. In accordance with the present invention I provide the underface of the plate 21 near its periphery with a projecting cam lug 23, and diametrically opposite with a sixth projection 24. The cam lug engages the ball 14 when the projection 24 lies within the groove 9 and the knob is at Vent and rolls it out of its conical seat 12, as shown in Figure 3, thereby positively opening the relief vent 11 and keeping it open. It thus becomes impossible for a vacuum to form and the cooker is rapidly and automatically vented.

There is another advantage flowing from my invention: Sometimes food particles are expelled through the vent and lodge around the ball in the ball seat so as to interfere with the escape of steam. If the ball is positively displaced during cooling, the inrush of air as the steam condenses sucks the food particles back into the cooker and clears the vent.

The boss 17 is provided with an axial bore 25 which is sealed by a plug of fusible metal 26. When the pressure within the cooker reaches a predetermined point, this metal plug melts and vents the cooker thus acting as a safety valve.

I claim:

1. A weighted relief valve assembly comprising a relief valve base having a pressure relief vent, a ball valve seated in the vent therein, a weight loosely and rotatably mounted on the base and overlying the valve, a plurality of projections on the underface of the weight spaced at varying distances from its center of gravity, the weight being supported upon the base by the valve and one of the projections beyond the center of gravity of the weight, so that the projection which is to serve as the second support or fulcrum for the weight can be selected by turning the weight, and the pressure at which the valve opens thereby controlled, and a cam lug on the weight for engaging and unseating the ball to open the vent.

2. A weighted relief valve assembly comprising a relief valve base having a pressure relief vent therein, a ball valve seated in the vent, a weighted knob loosely and rotatably mounted about its center of gravity on the base adjacent the vent, overlying and partly supported by the ball, an elevated groove on the base, below the knob and on the side of the center of gravity opposite the ball, a plurality of projections on the underface of the knob spaced different distances from the center of gravity of the knob and each designed to lie, one at a time, in the groove and share the support of the knob with the ball and serve as a fulcrum for the knob, and a depending cam lug on the underface of the knob for engaging and unseating the ball to open the vent, whereby the knob may be rotated manually to place a selected projection within the groove or to unseat the ball, to vary the external pressure on the ball or to vent the valve.

CHARLES W. ABERCROMBIE.

REFERENCES CITED

The following references are of record in the file of this patent:

UNITED STATES PATENTS

| Number | Name | Date |
|--------|------|------|
| 280,721 | Culver | July 3, 1883 |
| 1,464,116 | Steudel | Aug. 7, 1923 |
| 2,115,998 | O'Conner | May 3, 1938 |
| 2,200,903 | Stephens | May 14, 1940 |